United States Patent
Sivaraman

(10) Patent No.: US 11,797,943 B2
(45) Date of Patent: Oct. 24, 2023

(54) MACHINE LEARNING-BASED RECRUITMENT SYSTEM AND METHOD

(71) Applicant: Hariharan Sivaraman, San Carlos, CA (US)

(72) Inventor: Hariharan Sivaraman, San Carlos, CA (US)

( * ) Notice: Subject to any disclaimer, the term of this patent is extended or adjusted under 35 U.S.C. 154(b) by 10 days.

(21) Appl. No.: 17/724,490

(22) Filed: Apr. 20, 2022

(65) Prior Publication Data

US 2023/0274234 A1  Aug. 31, 2023

Related U.S. Application Data

(63) Continuation-in-part of application No. 17/682,553, filed on Feb. 28, 2022.

(51) Int. Cl.
*G06Q 10/1053* (2023.01)
*G06Q 10/0639* (2023.01)
*G06N 20/00* (2019.01)

(52) U.S. Cl.
CPC ... *G06Q 10/1053* (2013.01); *G06Q 10/06393* (2013.01); *G06N 20/00* (2019.01)

(58) Field of Classification Search
CPC ......... G06Q 10/1053; G06Q 10/06393; G06N 20/00
See application file for complete search history.

(56) References Cited

U.S. PATENT DOCUMENTS

| | | | |
|---|---|---|---|
| 2016/0364692 A1* | 12/2016 | Bhaskaran | G06Q 10/1053 |
| 2017/0255906 A1* | 9/2017 | Le | G06F 16/9535 |
| 2018/0232434 A1* | 8/2018 | Geyik | G06Q 10/1053 |
| 2019/0057356 A1* | 2/2019 | Larsen | G06V 10/82 |
| 2019/0102704 A1* | 4/2019 | Liu | G06N 5/022 |
| 2020/0184422 A1* | 6/2020 | Mondal | G06Q 10/063112 |
| 2020/0394592 A1* | 12/2020 | Shi | G06N 20/00 |
| 2020/0394615 A1* | 12/2020 | Sethre | G06Q 10/1053 |

OTHER PUBLICATIONS

Kulkarni, Swatee B., and Xiangdong Che. "Intelligent software tools for recruiting." Journal of International Technology and Information Management 28.2 (2019): 2-16. (Year: 2019).*

Lin, Ying-Tung; Hung, Tzu-Wei; Huang, Linus Ta-Lun. "Engineering Equity: How AI Can Help Reduce the Harm of Implicit Bias" Philosophy & Technology, suppl. 1 34: 65-90. Dordrecht: Springer Nature B.V. (Nov. 2021) (Year: 2021).*

* cited by examiner

Primary Examiner — Brendan S O'Shea
(74) Attorney, Agent, or Firm — Barry Choobin; Patent 360

(57) ABSTRACT

A system and method to aid in a recruitment process by providing a list of candidates that best match the job requirement. The system includes an explainable machine learning module that applies six layers of filters and profile matching to a set of job applications to shortlist a predefined number of applications. The shortlisted applications can be presented to recruited for logical assessment about the relevancy of each of the shortlisted applications. Based on the self-assessment, the set of applications can again be processed by the explainable machine learning module to shortlist a final list of candidates.

9 Claims, 7 Drawing Sheets

Candidate personal details masking

| 9 selected | v |

Diversity & Inclusion Weighted Parameters

Recent events have been 'eye openers' for many in terms of the need to foster Diversity & Inclusion in the workplace. Historically, we have seen a bias against Women and people of color resulting in an imbalance that needs to be redressed. The following parameters are an attempt to remedy this imbalance, We encourage hiring managers to provide a higher weightage towards Women and people of color candidates to support this endeavor. You can ofcourse, choose to be neutral and provide equal weightages.

Gender

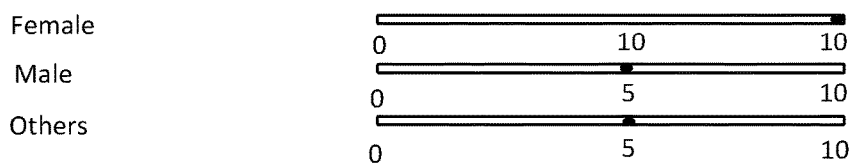

Female — 0 ... 10 ... 10
Male — 0 ... 5 ... 10
Others — 0 ... 5 ... 10

Ethnicity

Others — 0 ... 7 ... 10
Asian Descent — 0 ... 5 ... 10
European Descent — 0 ... 5 ... 10
Hispanic Descent — 0 ... 6 ... 10
African Descent — 0 ... 10 ... 10

Save and Next

Fig. 4

WHASSP (Weighted Hard And Soft Skill Parameters)

Hard Skills

[Search hard skills to add...]

| Skill Name | Weightage | Desired Years of Experience |
|---|---|---|
| JavaScript | 0 —————— 8 ————— 10 ■ | 3  x |
| Angular | 0 ———— 7 ■ ———— 10 | 2  x |
| SQL | 0 —————— 9 ■ — 10 | 4  x |
| .NET Framework | 0 —————— 9 ■ — 10 | 5  x |

Soft Skills

[Search soft skills to add...]

| Skill Name | Weightage | Desired Years of Experience |
|---|---|---|
| Positive Attitude | 0 —————— 8 ■ ———— 10 | 4  x |
| Team Player | 0 ———— 8 ■ ————— 10 | 3  x |

[ Save & Next ]

Fig. 6

Self appraisal for Job Skills

Hard Skills

| Skill | Rating | Experience |
|---|---|---|
| .NET Framework | Poor — Avg. — Good — Great (Great) | Your experience in years |
| SQL | Poor — Avg. — Good — Great (Good) | Your experience in years |
| Angular | Poor — Avg. — Good — Great (Good) | Your experience in years |
| JavaScript | Poor — Avg. — Good — Great (Good) | Your experience in years |

Soft Skills

| Skill | Rating | Experience |
|---|---|---|
| Team player | Poor — Avg. — Good — Great (Good) | Your experience in years |
| Positive Attitude | Poor — Avg. — Good — Great (Good) | Your experience in years |

*Please add rating and experience for each skill

For years of experience in soft skill, please include the skills learnt both as part of your carrier as well as skills learnt outside of career. For instance, if the skill is 'team player', and you have demonstrated this skill for 3 years in your professional carrier and have played in a soccer team for 2 years for your school, university, club, etc. then you should include that as well and the total years of experience in this skill should be 5 years

| | |
|---|---|
| LinkedIn | LinkedIn Profile URL |
| GitHub | GitHub URL |
| Blog/Website | Blog/Website Link |
| Facebook | Facebook Profile URL |
| Twitter | Twitter Profile URL |

Fig. 7

MACHINE LEARNING-BASED RECRUITMENT SYSTEM AND METHOD

CROSS-REFERENCE TO RELATED APPLICATIONS

This application claims priority to the U.S. non-provisional patent application Ser. No. 17/682,553 filed on Feb. 28, 2022 which is incorporated herein by reference in its entirety.

FIELD OF INVENTION

The present invention relates to the machine learning-based system and method for recruitment, and more particularly, the present invention relates to an explainable machine learning model for recruitment.

BACKGROUND

The term recruitment broadly refers to the process of hiring candidates for job positions in organizations. Recruitment is an important process in every organization through which new employees are hired. Recruitment, however, is a multiple-step complex process. The first step in the process is to figure out the requirements for a vacant job and generate an advertisement based on the requirements. Then reaching out to invite applications from candidates by publishing the advertisement. The advertisement can be published through a variety of sources, such as printing in newspapers or magazines, online job portals, and the like. The received applications are then analyzed to shortlist candidates for further processing, such as an interview.

Often an overwhelming number of applications can be received by an organization for one or a few job positions, specifically by big organizations. To analyze such a large number of applications requires manpower and a lot of working hours. This escalates the cost of recruitment and makes the process tedious. Additionally, the human factor makes the process less efficient because of the bias introduced into the recruitment process.

Various kinds of software are available that makes the process of reviewing the applications faster. Most of such software is organizing and collaborating software that only automates a few steps in the analysis.

Thus, a need is appreciated for a system and method that can shortlist candidates from a bulk of applications and avoid human bias in the analysis process.

Hereinafter, the terms "profile(s)", "application(s)", and "job application(s)" are interchangeably used and refers to a disclosure from a candidate showing an interest in a job position, and the disclosure includes details of the candidates such as the personal details, contact details, work experience, education, and the like relevant for a recruitment process.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system and method that can automate short-listing of candidates from a bulk of job applications.

It is another object of the present invention that a human bias in the selection process can be minimized.

It is still another object of the present invention that the system can actively learn the job requirements.

It is yet another object of the present invention that the system uses machine learning models to analyze the applications.

It is a further object of the present invention that the machine learning model is explainable.

In one aspect, disclosed is a system to aid in a recruitment process, the system comprising a processor and a memory, the system configured to implement a method comprising the steps of receiving a set of applications for one or more job vacancies; subjecting the set of applications to a machine learning based multi-layered analysis module, wherein the analysis module upon execution by the processor applies a plurality of filters to the set of applications and further subject the set of applications to profile matching, wherein the analysis module is explainable; scoring, by the analysis module, each application of the set of applications; presenting, by the analysis module, a predetermined number of applications from the set of applications based on the scoring; receive a logical assessment for each of the predetermined number of applications; updating, the analysis module using reinforcement learning and the logical assessment of the each of the predetermined number of applications; and upon updating, determining a list of shortlisted applications from the set of applications by subjecting the set of applications to the updated analysis module. The plurality of filters comprises six layers of filtering. The updated analysis module causes rescoring of the each of the set of applications. The method further comprises the steps of receiving a self-assessment form from a plurality of candidates of the set of applications. The method further comprises the steps of receiving a benchmark application, wherein the benchmark application and the self-assessment form are used for the profile matching. The predetermined number of applications are presented such that certain predefined information in the predetermined number of applications is masked to prevent human bias in the logical assessment. The method further comprises the steps of providing an interface to receive a weightage for a plurality of hard and soft skill requirements for the one or more job vacancies.

In one aspect, disclosed is a method to aid in a recruitment process, the method implemented within a system comprising a processor and a memory, the method comprising the steps of receiving a set of applications for one or more job vacancies; subjecting the set of applications to a machine learning based multi-layered analysis module, wherein the analysis module upon execution by the processor applies a plurality of filters to the set of applications and further subject the set of applications to profile matching, wherein the analysis module is explainable; scoring, by the analysis module, each application of the set of applications; presenting, by the analysis module, a predetermined number of applications from the set of applications based on the scoring; receive a logical assessment for each of the predetermined number of applications; updating, the analysis module using reinforcement learning and the logical assessment of the each of the predetermined number of applications; and upon updating, determining a list of shortlisted applications from the set of applications by subjecting the set of applications to the updated analysis module.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 4 shows another implementation of the interface, which is a screen for diversity and inclusion features, according to an exemplary embodiment of the present invention.

FIG. 6 shows another implementation of the interface, which is a screen to capture job requirements, according to an exemplary embodiment of the present invention.

FIG. 7 shows another implementation of the interface, which is a screen illustrating the self-assessment form, according to an exemplary embodiment of the present invention.

DETAILED DESCRIPTION

Figure 1:
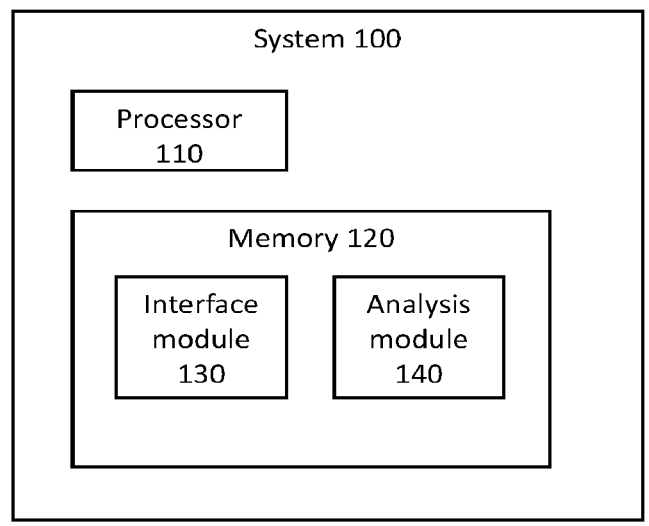
FIG. 1 is a block diagram illustrating an architecture of the system, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a system and method for aiding the organizations to get a list of shortlisted profiles or applications for different job positions/vacancies. Disclosed is a machine learning-based system that analyzes the bulk of job applications to get a list of a predetermined number of shortlisted applications that can be processed further, such as scheduling interviews. Disclosed is a reinforcement learning-based machine learning model that is explainable and can learn job requirements to find out best matches from the available pool of job applications. The disclosed system and method can significantly reduce human bias in the recruitment process. Moreover, the time-consuming step of manually reviewing the bulk of applications can be done in a noticeably brief time with more accuracy, and this enhances both productivity and efficiency. Different organizations can use the disclosed system and method to quickly get a list of candidates that best matches their job requirements. For example, ten scrutinized applications can be provided to the human resource team of an organization. The advantage of the disclosed system is an explainable machine learning model that can help the HR team to understand the analysis done by the machine learning model and thus be more confident about the shortlisted applications.

Referring to FIG. 1 which is a block diagram showing an architecture of the disclosed system. The disclosed system and method implemented within the system can analyze a bulk of job applications to get a predetermined number of applications that best match the job requirements. The disclosed system 100 can include a processor 110 and a memory 120. The memory can include an interface module 130 and an analysis module 140. The modules can be software, program, code, or a set of instructions that upon executing by the processor perform the disclosed methodology of shortlisting the job applications. The interface module 130 upon execution by the processor can provide an interface that allows users to interact with the disclosed system to both upload and download information. The interface can be implemented as multiple screens, each screen for a specific function, such as receiving job requirements, receiving self-assessment from candidates, and like aspects of the invention discussed below. The analysis module can analyze a bulk of applications using a machine learning model implemented within the system, to shortlist a predefined number of applications that best match the job requirements.

Figure 2:
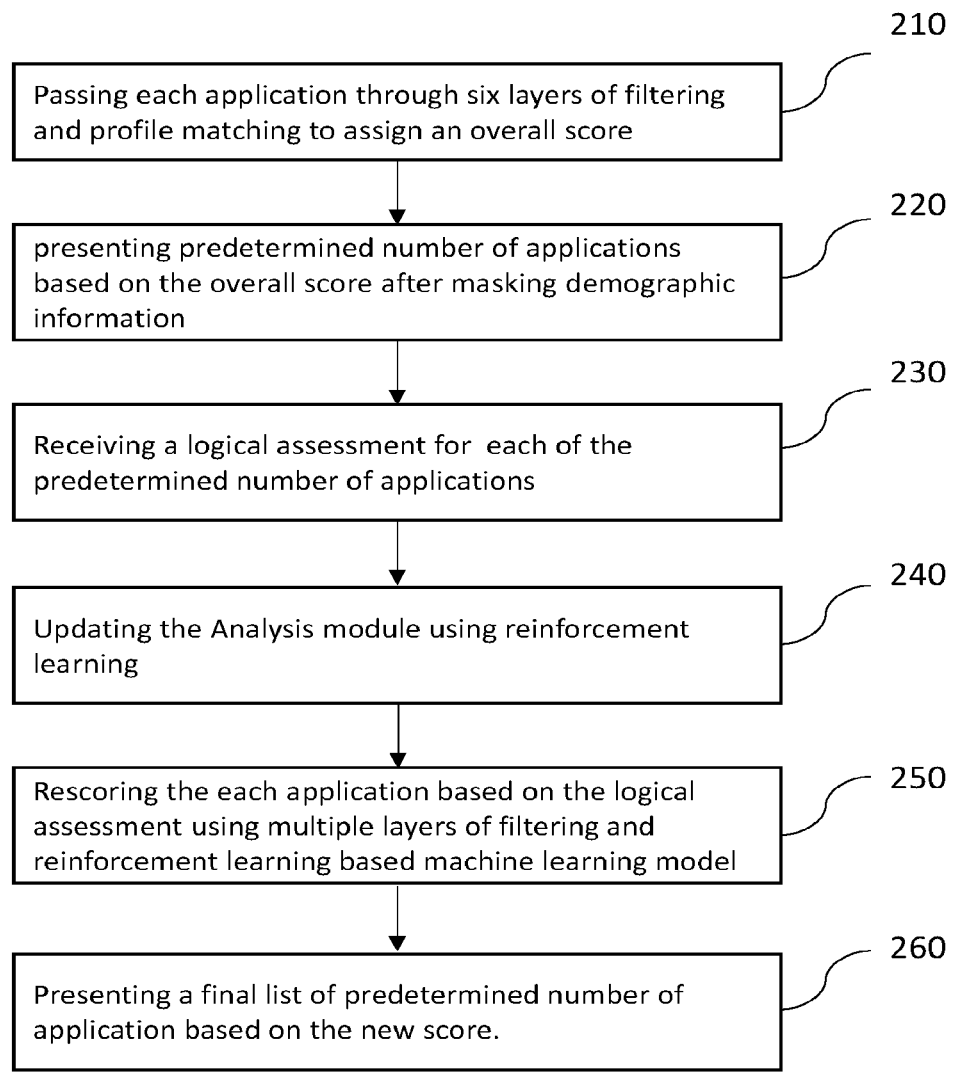
FIG. 2 is a flowchart illustrating the disclosed methodology for the machine learning-based shortlisting of candidates from the bulk of applications for a job position, according to an exemplary embodiment of the present invention.

Referring to FIG. 2 which is a flowchart illustrating a disclosed methodology of shortlisting candidates for a job application. A bulk of applications from a variety of sources can be analyzed by the disclosed analysis module that is based on machine learning. Each application can pass through six layers of filtering and profile matching, at step 210. The analysis module through an interface generated by the interface module can receive job requirements. The analysis module then based on the job requirements can analyze the bulk of applications using machine learning-based filtering and profile matching. Each application can be assigned a score by the analysis module. The disclosed analysis module can be explainable, i.e., the steps behind scoring can be explainable so that the recruiters can be more confident with the shortlisted candidates.

The disclosed analysis module can then present the shortlisted applications that have the highest score, at step 220. The number of applications to be presented can be discretionary, for example, the recruiter may want ten shortlisted applications. The short-listed applications can be presented to the recruiter or the user through the interface for assessment. The disclosed analysis module can mask certain fields in the shortlisted applications to prevent any bias in the assessment of the shortlisted applications by the user. The fields to be masked can also be predefined and can include religion, color, gender, and the like. The user can review each of the shortlisted applications to provide an assessment for each shortlisted application, at step 230. The assessment can be whether the shortlisted application is relevant or not relevant to the user. The assessment can be logical wherein the user can say yes or no to a shortlisted application. For example, to each application, two icons i.e., thumbs up and thumbs down can be provided by the interface, wherein the user can select any of the two icons. If the shortlisted application is relevant to the user, the user can mark the thumbs up icon for the application i.e., the logical yes. If the application is not relevant to the user, the user can mark the thumbs down icon, i.e., the logical assessment as no.

The disclosed analysis module can input the logical assessment received for each shortlisted application from the user and can redefine the profile matching criteria using the reinforcement learning approach, at step 240.

The bulk of applications or a set of the bulk of applications can then be re-scored by subjecting the applications to filtering and profile matching step by the updated analysis module, at step 250. The above process can be repeated until the desired set of shortlisted applications can be received by the user. The final set of shortlisted applications can then be presented to the user for further processing such as scheduling interviews, at step 260.

Figure 3:
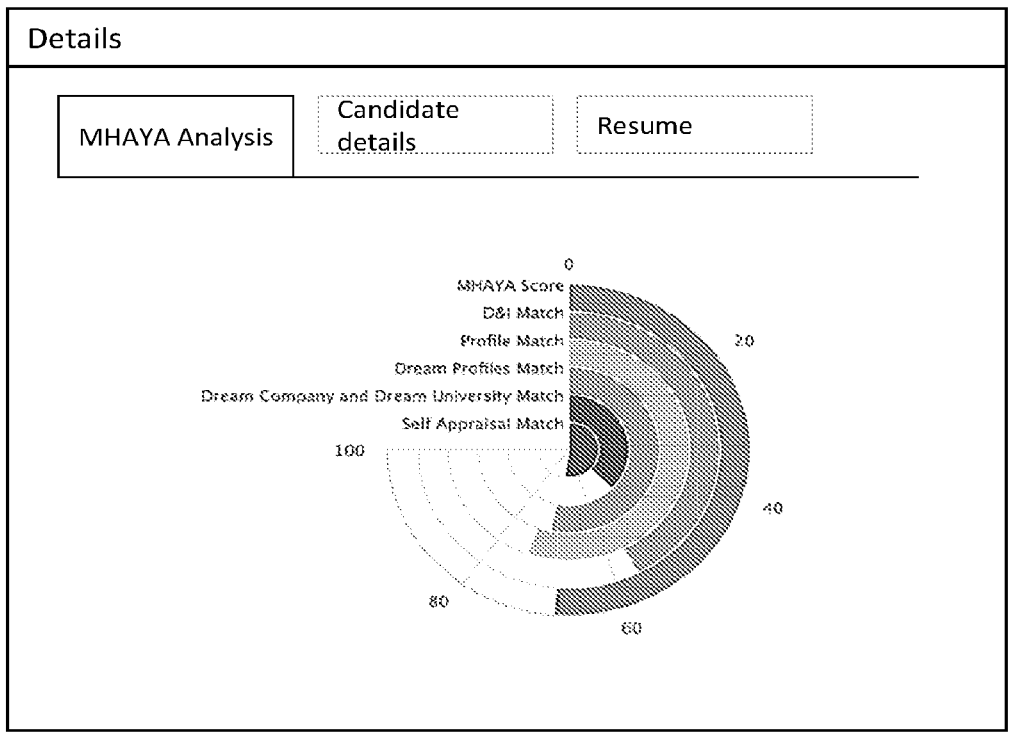
FIG. 3 shows an implementation of the interface, which is a screen showing score, according to an exemplary embodiment of the present invention.

Referring to FIG. 3 which illustrates an interface, and more specifically a screen of the interface showing scoring of each job application based on several parameters or filters. The disclosed analysis module combines multiple artificial intelligence features ranging from heuristics, conventional machine learning, and reinforcement learning resulting in a powerful, accurate, explainable and ethical system to help organizations with their recruiting needs.

Referring to FIG. 4 which shows another screen generated by the interface module for receiving criteria for masking certain information in the shortlisted profiles that are presented to the recruiter. The disclosed feature can significantly reduce bias in the recruitment by masking certain information in the profiles presented for assessment by the users. The information masked can be related to gender, ethnicity, name, location, etc. however, the disclosed system can also handle intentional bias that may be introduced for certain objects, such as to redress imbalances in organization composition. The screen in FIG. 4 shows options to assign weightage to different parameters, such as gender and ethnicity. The system can receive input through the screen shown in FIG. 4, wherein the input can become a part of the job requirement and be used as a factor in profile filtering and matching.

Figure 5:
FIG. 5 shows another implementation of the interface, which is a screen to capture profiles that can be used to analyze applications, according to an exemplary embodiment of the present invention.

Referring to FIG. 5 which shows another interface that allows the users to provide a benchmark application that can be used in the analysis. Referring to FIG. 3, dream profile match and dream company and dream university match can be obtained through the screen shown in FIG. 5.

Referring to FIG. 6 which shows another screen to take added input from the user for the job requirements. The user can specify the weightage of different hard and soft skills parameters through the screen shown in FIG. 6.

Referring to FIG. 7 which shows another screen of the interface through which self-assessment from the candidates can be obtained. The screen can be presented to the candidates for receiving information, such as the rating of their soft and hard skills, experiences, social profiles, and the like.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A system to aid in a recruitment process, the system comprising a processor and a memory, the system configured to implement a method comprising the steps of:

receiving a set of applications for one or more job vacancies;

subjecting the set of applications to a machine learning based multi-layered analysis module, wherein the analysis module upon execution by the processor applies a plurality of filters to the set of applications and further subject the set of applications to profile matching, wherein the analysis module is explainable;

scoring, by the analysis module, each application of the set of applications;

presenting, by the analysis module, a predetermined number of applications from the set of applications based on the scoring;

receiving a logical assessment for each of the predetermined number of applications;

updating, the analysis module using reinforcement learning and the logical assessment of the each of the predetermined number of applications;

upon updating, determining a list of shortlisted applications from the set of applications by subjecting the set of applications to the updated analysis module;

providing a hiring manager interface configured to receive weighted hard and soft skill parameters, wherein the weighted hard and soft skill parameters comprise one or more skills, weightage associated with each of the one or more skills, experience level associated with each of the one or more skills, and expertise level for each of the one or more skills; and receiving self-assessment forms using a pre-defined template from a plurality of candidates of the set of applications for self-assessment data, the pre-defined template comprises sections for hard skills and soft skill, the pre-defined template configured to receive weightage and years of experience for the hard skills and the soft skills;

wherein the plurality of filters comprises a dream profile match layer, a dream company and dream university match layer, a Diversity & Inclusion match layer, a self-appraisal layer, and a profile match layer, wherein the dream profile match layer uses a benchmark application for analysis, the self-appraisal layer is configured to use the self-assessment data from candidates, and the Diversity & Inclusion match layer is configured to input weighted parameters based on gender and ethnicity.

2. The system according to claim 1, wherein the plurality of filters comprises six layers of filtering.

3. The system according to claim 1, wherein the updated analysis module causes rescoring of the each of the set of applications.

4. The system according to claim 1, wherein the predetermined number of applications are presented such that certain predefined information in the predetermined number of applications is masked to prevent human bias in the logical assessment, and to assign weights for each of the diversity parameters wherein the method further comprises:
providing candidate personal details masking and diversity parameter weightage interface for receiving the certain predefined information for masking, the candidate personal details masking interface configured to receive weighted diversity parameters comprising gender, ethnicity, and disability status.

5. A method to aid in a recruitment process, the method implemented within a system comprising a processor and a memory, the method comprising the steps of:
receiving a set of applications for one or more job vacancies;
subjecting the set of applications to a machine learning based multi-layered analysis module, wherein the analysis module upon execution by the processor applies a plurality of filters to the set of applications and further subject the set of applications to profile matching, wherein the analysis module is explainable;
scoring, by the analysis module, each application of the set of applications;
presenting, by the analysis module, a predetermined number of applications from the set of applications based on the scoring;
receiving a logical assessment for each of the predetermined number of applications;
updating, the analysis module using reinforcement learning and the logical assessment of the each of the predetermined number of applications;
upon updating, determining a list of shortlisted applications from the set of applications by subjecting the set of applications to the updated analysis module;
providing a hiring manager interface configured to receive weighted hard and soft skill parameters, wherein the weighted hard and soft skill parameters comprise one or more skills, weightage associated with each of the one or more skills, experience level associated with each of the one or more skills, and expertise level for each of the one or more skills; and
receiving self-assessment forms using a pre-defined template from a plurality of candidates of the set of applications for self-assessment data, the pre-defined template comprises sections for hard skills and soft skill, the pre-defined template configured to receive weightage and years of experience for the hard skills and the soft skills;
wherein the plurality of filters comprises a dream profile match layer, a dream company and dream university match layer, a Diversity & Inclusion match layer, a self-appraisal layer, and a profile match layer, wherein the dream profile match layer uses a benchmark application for analysis, the self-appraisal layer is configured to use the self-assessment data from candidates, and the Diversity & Inclusion match layer is configured to input weighted parameters based on gender and ethnicity.

6. The method according to claim 5, wherein the plurality of filters comprises six layers of filtering.

7. The method according to claim 5, wherein the updated analysis module causes rescoring the each of the set of applications.

8. The method according to claim 5, wherein the method further comprises the steps of: receiving the benchmark application.

9. The method according to claim 5, wherein the predetermined number of applications are presented such that certain predefined information in the predetermined number of applications is masked to prevent human bias in the logical assessment, wherein the method further comprises:
providing candidate personal details masking and assigning weights for diversity parameters interface for receiving the certain predefined information for masking, the candidate personal details masking interface configured to receive weighted parameters for diversity parameters comprising gender, ethnicity, and disability status.

* * * * *